United States Patent
Hu et al.

(10) Patent No.: US 10,666,650 B2
(45) Date of Patent: May 26, 2020

(54) PACKET PROCESSING METHOD IN PPPOE AUTHENTICATION PROCESS AND RELEVANT DEVICE

(71) Applicant: Huawei Technologies Co., Ltd., Shenzhen (CN)

(72) Inventors: Ting Hu, Beijing (CN); Guofeng Qian, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 15/795,835

(22) Filed: Oct. 27, 2017

(65) Prior Publication Data

US 2018/0054439 A1 Feb. 22, 2018

Related U.S. Application Data

(63) Continuation of application No. PCT/CN2015/097532.

(30) Foreign Application Priority Data

Apr. 29, 2015 (CN) .......................... 2015 1 0212801

(51) Int. Cl.
| | |
|---|---|
| *H04L 29/06* | (2006.01) |
| *H04L 29/08* | (2006.01) |
| *H04L 12/28* | (2006.01) |
| *H04L 12/26* | (2006.01) |
| *H04L 12/741* | (2013.01) |

(52) U.S. Cl.
CPC ...... *H04L 63/0876* (2013.01); *H04L 12/2859* (2013.01); *H04L 12/2872* (2013.01);
(Continued)

(58) Field of Classification Search
CPC . H04L 63/08; H04L 63/0876; H04L 12/2859; H04L 12/2872; H04L 29/08; H04L 43/16; H04L 45/74

See application file for complete search history.

(56) References Cited

U.S. PATENT DOCUMENTS

2005/0033853 A1* 2/2005 Jones .................. H04L 12/2859
709/230
2009/0092051 A1 4/2009 Miyata
(Continued)

FOREIGN PATENT DOCUMENTS

| CN | 1812340 A | 8/2006 |
|---|---|---|
| CN | 101197837 A | 6/2008 |

(Continued)

OTHER PUBLICATIONS

Machine Translation and Abstract of Chinese Publication No. CN101404663, dated Apr. 8, 2009, 17 pages.
(Continued)

*Primary Examiner* — Hee K Song
(74) *Attorney, Agent, or Firm* — Conley Rose, P.C.

(57) ABSTRACT

Embodiments of the present application provide a packet processing method in a Point-to-Point Protocol over Ethernet (PPPoE) authentication process and a relevant device. A first broadcast access server (BAS) exists in a broadcast domain in which a user terminal is located, the first BAS supports the PPPoE and corresponds to a first operator. The method includes receiving, by the first BAS, a PPPoE active discovery initiation (PADI) packet sent by the user terminal; and when determining that a quantity of authentication failures of the user terminal on the first BAS is greater than a preset threshold, skipping sending, by the first BAS, a PPPoE active discovery offer (PADO) packet to the user terminal in a preset period. The technical solutions in the embodiments of the present application resolve a problem that the user terminal cannot perform access because the user terminal establishes a session with the first BAS.

20 Claims, 6 Drawing Sheets

(52) U.S. Cl.
CPC .............. *H04L 29/08* (2013.01); *H04L 43/16* (2013.01); *H04L 45/74* (2013.01); *H04L 63/08* (2013.01)

(56) References Cited

U.S. PATENT DOCUMENTS

| | | | | |
|---|---|---|---|---|
| 2010/0325295 | A1* | 12/2010 | Kajiwara | ............ H04L 12/2872 709/229 |
| 2012/0281591 | A1* | 11/2012 | Gu | ...................... H04L 12/2859 370/254 |
| 2014/0233387 | A1 | 8/2014 | Zheng et al. | |

FOREIGN PATENT DOCUMENTS

| | | | |
|---|---|---|---|
| CN | 101404663 | A | 4/2009 |
| CN | 101547158 | A | 9/2009 |
| CN | 101621515 | A | 1/2010 |
| CN | 102035867 | A | 4/2011 |
| CN | 103095597 | A | 5/2013 |
| CN | 104301336 | A | 1/2015 |
| CN | 104852974 | A | 8/2015 |

OTHER PUBLICATIONS

Foreign Communication From A Counterpart Application, Chinese Application No. 201510212801.9, Chinese Notice of Allowance dated Jun. 29, 2018, 4 pages.

Machine Translation and Abstract of Chinese Publication No. CN1812340, dated Aug. 2, 2006, 11 pages.

Machine Translation and Abstract of Chinese Publication No. CN101197837, dated Jun. 11, 2008, 8 pages.

Machine Translation and Abstract of Chinese Publication No. CN101547158, dated Sep. 30, 2009, 16 pages.

Machine Translation and Abstract of Chinese Publication No. CN101621515, dated Jan. 6, 2010, 8 pages.

Machine Translation and Abstract of Chinese Publication No. CN102035867, dated Apr. 27, 2011, 9 pages.

Machine Translation and Abstract of Chinese Publication No. CN104301336, dated Jan. 21, 2015, 6 pages.

Machine Translation and Abstract of Chinese Publication No. CN104852974, dated Aug. 19, 2015, 36 pages.

Mamakos, L., et al., "A Method for Transmitting PPP Over Ethernet (PPPoE)," RFC 2516, Feb. 1999, 17 pages.

Foreign Communication From A Counterpart Application, Chinese Application No. 201510212801.9, Chinese Office Action dated Aug. 18, 2017, 7 pages.

Foreign Communication From A Counterpart Application, PCT Application No. PCT/CN2015/097532, English Translation of International Search Report dated Mar. 14, 2016, 2 pages.

Foreign Communication From A Counterpart Application, European Application No. 15890644.6, Extended European Search Report dated Feb. 22, 2018, 6 pages.

* cited by examiner

301 — A BAS receives a PADI packet sent by a user terminal, where a tag of the PADI packet carries authentication information of the user terminal 302 — The BAS obtains the authentication information from the PADI packet 303 — When determining, according to the authentication information of the user terminal, that authentication of the user terminal on the BAS fails, the BAS skips sending a PADO packet to the user terminal in a preset period

FIG. 3

401 — A user terminal sends a PADI packet to a BAS, where a tag of the PADI packet carries authentication information of the user terminal, and the PADI packet is used to instruct the BAS to skip sending a PADO packet to the user terminal in a preset period when the BAS determines, according to the authentication information, that authentication of the user terminal on the BAS fails

PACKET PROCESSING METHOD IN PPPOE AUTHENTICATION PROCESS AND RELEVANT DEVICE

CROSS-REFERENCE TO RELATED APPLICATIONS

This application is a continuation of International Patent Application No. PCT/CN2015/097532, filed on Dec. 16, 2015, which claims priority to Chinese Patent Application No. 201510212801.9, filed on Apr. 29, 2015. The disclosures of the aforementioned applications are hereby incorporated by reference in their entireties.

TECHNICAL FIELD

Embodiments of the present application relate to the field of communications technologies, and in particular, to a packet processing method in a Point-to-Point Protocol over Ethernet (PPPoE) authentication process and a relevant device.

BACKGROUND

A PPPoE authentication technology is a common broadband authentication technology, and by means of the PPPoE authentication technology, a user terminal can access a broadband access server (BAS) corresponding to an operator.

A PPPoE authentication process includes two stages. At a first stage, that is, a discovery stage, a user terminal discovers BASs supporting the PPPoE in a broadcast domain in which the user terminal is located, and selects a BAS from the BASs to establish a session. During specific implementation, the user terminal sends a PPPoE active discovery initiation (PADI) packet to the broadcast domain in a broadcast manner, and any BAS supporting the PPPoE returns a PPPoE active discovery offer (PADO) packet to the user terminal after receiving the PADI packet. The user terminal receives multiple PADO packets and selects, according to a particular rule, a BAS corresponding to a PADO packet to establish a session. A second stage is a session stage. At this stage, the user terminal sends authentication information to the BAS that establishes the session with the user terminal, so as to perform authentication.

However, if multiple BASs corresponding to multiple operators exist in the broadcast domain in which the user terminal is located, and all the multiple BASs support the PPPoE, when selecting a corresponding BAS according to the received multiple PADO packets, the user terminal probably selects an incorrect BAS to establish a session. Subsequently, authentication inevitably fails, leading to a problem that the user terminal cannot perform access. For example, both a BAS corresponding to a telecommunications network and a BAS corresponding to an education network exist in a broadcast domain in which a user terminal is located. The user terminal can access the telecommunications network according to authentication information. At the discovery stage, the user terminal separately sends PADI packets to the BAS corresponding to the telecommunications network and the BAS corresponding to the education network, and separately receives returned PADO packets. The user terminal establishes, according to the received PADO packet, a session with the BAS corresponding to the education network. At the session stage, when the user terminal sends, to the BAS corresponding to the education network, authentication information for accessing the telecommunications network, authentication inevitably fails. In addition, the user terminal cannot access the BAS corresponding to the telecommunications network. As can be seen, the user terminal establishes the session with the incorrect BAS, leading to the problem that the user terminal cannot perform access.

SUMMARY

A technical problem to be resolved by embodiments of the present application is to provide a packet processing method in a PPPoE authentication process and a relevant device, so as to resolve a problem that a user terminal cannot perform access because the user terminal establishes a session with an incorrect BAS.

In view of this, technical solutions used in the embodiments of the present application to resolve the technical problem are as follows.

According to a first aspect, an embodiment of the present application provides a packet processing method in a PPPoE authentication process, where a first BAS exists in a broadcast domain in which a user terminal is located, the first BAS supports the PPPoE and corresponds to a first operator, and a BAS that supports the PPPoE and that corresponds to a second operator also exists in the broadcast domain in which the user terminal is located; and the method includes receiving, by the first BAS, a PADI packet sent by the user terminal; and when determining that a quantity of authentication failures of the user terminal on the first BAS is greater than a preset threshold, skipping sending, by the first BAS, a PADO packet to the user terminal in a preset period.

In a first possible implementation manner of the first aspect, the method further includes when determining that the quantity of authentication failures of the user terminal on the first BAS is less than the preset threshold, sending, by the first BAS, the PADO packet to the user terminal in the preset period.

With reference to the first aspect or the first possible implementation manner of the first aspect, in a second possible implementation manner of the first aspect, the skipping sending, by the first BAS, a PPPoE active discovery offer PADO packet to the user terminal in a preset period includes when determining that a second BAS that supports the PPPoE and that corresponds to the second operator exists in the broadcast domain in which the user terminal is located, skipping sending, by the first BAS, the PADO packet to the user terminal in the preset period.

With reference to the first aspect or the first possible implementation manner of the first aspect, in a third possible implementation manner of the first aspect, the method further includes receiving, by the first BAS, authentication information sent by the user terminal; and when determining, according to the authentication information, that authentication of the user terminal on the first BAS fails, increasing, by the first BAS, 1 to the quantity of authentication failures of the user terminal on the first BAS.

With reference to the first aspect or the first possible implementation manner of the first aspect, in a fourth possible implementation manner of the first aspect, the method further includes periodically setting, by the first BAS, the quantity of authentication failures of the user terminal on the first BAS to 0.

According to a second aspect, an embodiment of the present application provides a packet processing method in a PPPoE authentication process, including receiving, by a BAS, a PADI packet sent by a user terminal, where a tag of the PADI packet carries authentication information of the user terminal; obtaining, by the BAS, the authentication information from the PADI packet; and when determining, according to the authentication information of the user terminal, that authentication of the user terminal on the BAS fails, skipping sending, by the BAS, a PADO packet to the user terminal in a preset period.

In a first possible implementation manner of the second aspect, the method further includes when determining, according to the authentication information of the user terminal, that authentication of the user terminal on the BAS succeeds, sending, by the BAS, the PADO packet to the user terminal in the preset period.

In a second possible implementation manner of the second aspect, the determining, according to the authentication information of the user terminal, that authentication of the user terminal on the BAS fails includes sending, by the BAS, the authentication information to an authentication server; and receiving, by the BAS, an authentication failure message sent by the authentication server.

According to a third aspect, an embodiment of the present application provides a packet processing method in a PPPoE authentication process, including sending, by a user terminal, a PADI packet to a BAS, where a tag of the PADI packet carries authentication information of the user terminal, and the PADI packet is used to instruct the BAS to skip sending a PADO packet to the user terminal in a preset period when the BAS determines, according to the authentication information, that authentication of the user terminal on the BAS fails.

According to a fourth aspect, an embodiment of the present application provides a BAS, where the BAS is a first BAS that supports the PPPoE and that corresponds to a first operator, the first BAS is in a broadcast domain in which a user terminal is located, and a BAS that supports the PPPoE and that corresponds to a second operator also exists in the broadcast domain in which the user terminal is located; and the first BAS includes a receiving unit, a processing unit, and a sending unit, where the receiving unit is further configured to receive a PADI packet sent by the user terminal; and the processing unit is configured to when determining that a quantity of authentication failures of the user terminal on the first BAS is greater than a preset threshold, skip sending a PADO packet to the user terminal in a preset period by using the sending unit.

In a first possible implementation manner of the fourth aspect, the processing unit is further configured to when determining that the quantity of authentication failures of the user terminal on the first BAS is less than the preset threshold, send the PADO packet to the user terminal in the preset period by using the sending unit.

With reference to the fourth aspect or the first possible implementation manner of the fourth aspect, in a second possible implementation manner of the fourth aspect, when the PADO packet is not sent to the user terminal in the preset period by using the sending unit, the processing unit is configured to when determining that a second BAS that supports the PPPoE and that corresponds to the second operator exists in the broadcast domain in which the user terminal is located, skip sending the PADO packet to the user terminal in the preset period by using the sending unit.

With reference to the fourth aspect or the first possible implementation manner of the fourth aspect, in a third possible implementation manner of the fourth aspect, the receiving unit is further configured to receive authentication information sent by the user terminal; and the processing unit is further configured to when determining, according to the authentication information, that authentication of the user terminal on the first BAS fails, increase 1 to the quantity of authentication failures of the user terminal on the first BAS.

With reference to the fourth aspect or the first possible implementation manner of the fourth aspect, in a fourth possible implementation manner of the fourth aspect, the processing unit is further configured to periodically set the quantity of authentication failures of the user terminal on the first BAS to 0.

According to a fifth aspect, an embodiment of the present application provides a BAS, including a receiving unit, a processing unit, and a sending unit, where the receiving unit is configured to receive a PADI packet sent by a user terminal, where a tag of the PADI packet carries authentication information of the user terminal; the processing unit is configured to obtain the authentication information from the PADI packet; and the processing unit is further configured to when determining, according to the authentication information of the user terminal, that authentication of the user terminal on the BAS fails, skip sending a PADO packet to the user terminal in a preset period by using the sending unit.

In a first possible implementation manner of the fifth aspect, the processing unit is further configured to when determining, according to the authentication information of the user terminal, that authentication of the user terminal on the BAS succeeds, send the PADO packet to the user terminal in the preset period by using the sending unit.

In a second possible implementation manner of the fifth aspect, when determining, according to the authentication information of the user terminal, that authentication of the user terminal on the BAS fails, the processing unit is configured to send the authentication information to an authentication server by using the sending unit, and receive, by using the receiving unit, an authentication failure message sent by the authentication server.

According to a sixth aspect, an embodiment of the present application provides a user terminal, including a sending unit configured to send a PADI packet to a BAS, where a tag of the PADI packet carries authentication information of the user terminal, and the PADI packet is used to instruct the BAS to skip sending a PADO packet to the user terminal in a preset period when the BAS determines, according to the authentication information, that authentication of the user terminal on the BAS fails.

As can be known from the foregoing technical solutions, in the embodiments of the present application, after receiving a PADI packet sent by a user terminal, a BAS may not instantly send a PADO packet to the user terminal. Instead, when it is determined that a quantity of authentication failures of the user terminal on the first BAS is greater than a preset threshold, or it is determined, according to the authentication information carried in the PADI packet, that authentication of the user terminal on the BAS fails, it indicates that the user terminal probably does not need to access the BAS, that is, the user terminal does not need to access an operator corresponding to the BAS. Therefore, the BAS does not send the PADO packet to the user terminal in a preset period, so that the user terminal preferably processes a PADO packet sent by another BAS except the foregoing BAS, and does not establish a session with the foregoing BAS, thereby resolving a problem that the user terminal cannot perform access because the user terminal establishes a session with the foregoing BAS.

BRIEF DESCRIPTION OF DRAWINGS

To describe the technical solutions in the embodiments of the present application more clearly, the following briefly describes the accompanying drawings for describing the embodiments. The accompanying drawings in the following description show merely some embodiments of the present application, and persons of ordinary skill in the art may still derive other drawings from these accompanying drawings without creative efforts.

DESCRIPTION OF EMBODIMENTS

A PPPoE authentication process includes two stages. At a first stage, that is, a discover stage, a user terminal discovers BASs supporting the PPPoE in a broadcast domain in which the user terminal is located, and selects a BAS from the BASs to establish a session. During implementation, the user terminal sends a PADI packet to the broadcast domain in a broadcast manner. Any BAS supporting the PPPoE may return a PADO packet to the user terminal after receiving the PADI packet. The user terminal receives multiple PADO packets and selects, according to a particular rule, a BAS corresponding to a PADO packet. For example, the user terminal selects a BAS corresponding to a PADO packet that is first received. Then, the user terminal sends a PPPoE active discovery request (PADR) packet to the corresponding BAS. After receiving the PADR packet, the corresponding BAS generates a unique session identifier and carries the session identifier in a PPPoE active discovery session-confirmation (PADS) packet sent to the user terminal, so as to establish a session between the user terminal and the corresponding BAS. A second stage is a session stage. At this stage, the user terminal sends authentication information to the BAS that establishes the session at the discovery stage, so as to perform authentication. That the BAS supporting the PPPoE indicates that the BAS starts a PPPoE service.

In many scenarios, multiple BASs corresponding to multiple operators may exist in the broadcast domain in which the user terminal is located. The user terminal needs to separately access, according to different authentication information, the multiple BASs corresponding to the multiple operators.

However, in the PPPoE authentication process, if multiple BASs corresponding to multiple operators exist in the broadcast domain in which the user terminal is located, and all the multiple BASs support the PPPoE, because a process of authentication according to the authentication information is not involved at the discovery stage of PPPoE authentication, when selecting a corresponding BAS according to the received multiple PADO packets, the user terminal probably selects an incorrect BAS to establish a session. Subsequently, authentication inevitably fails at the session stage, leading to a problem that the user terminal cannot perform access. For example, both a BAS corresponding to a telecommunications network and a BAS corresponding to an education network exist in a broadcast domain in which a user terminal is located, and both the two BASs support the PPPoE. The user terminal can access the telecommunications network according to authentication information. At the discovery stage, the user terminal separately sends PADI packets to the BAS corresponding to the telecommunications network and the BAS corresponding to the education network, and separately receives PADO packets returned by the BAS corresponding to the telecommunications network and the BAS corresponding to the education network. The user terminal establishes, according to the received PADO packet, a session with the BAS corresponding to the education network. At the session stage, when the user terminal sends, to the BAS corresponding to the education network, the authentication information for accessing the telecommunications network, authentication inevitably fails. In addition, the user terminal cannot access the BAS corresponding to the telecommunications network. As can be seen, the user terminal establishes the session with the incorrect BAS, leading to the problem that the user terminal cannot perform access. When the user terminal discovers that access cannot be performed, generally, the user terminal initiates a PPPoE authentication process again. Because a rule used by the user terminal to select a BAS at the discovery stage generally does not change, the user terminal still probably selects an incorrect BAS to establish a session. As a result, the problem that the user terminal cannot perform access is still caused.

To resolve the technical problem, currently, different broadband authentication technologies are generally used. A user terminal accesses BASs corresponding to different operators, that is, in a broadcast domain in which the user terminal is located, the BASs corresponding to different operators respectively support different broadband authentication protocols. For example, the user terminal accesses an education network by using an internet protocol over ethernet (IPoE) authentication technology, and the user terminal accesses a telecommunications network by using a PPPoE authentication technology. That is, in the broadcast domain in which the user terminal is located, a BAS corresponding to the education network does not support the PPPoE, and a BAS corresponding to the telecommunications network supports the PPPoE. Therefore, the user terminal cannot find the BAS corresponding to the education network, and the user terminal may establish a session with only the BAS corresponding to the telecommunications network, and finally access the BAS corresponding to the telecommunications network. The IPoE authentication technology refers to a technology of authentication by using the Dynamic Host Configuration Protocol (DHCP) and an OPTION extension field. However, in this manner, the user terminal cannot access a BAS by using the PPPoE authentication technology in a scenario in which multiple BASs corresponding to multiple operators exist in the broadcast domain in which the user terminal is located, and all the multiple BASs corresponding to the multiple operators support the PPPoE.

The embodiments of the present application provide a packet processing method in a PPPoE authentication process and a relevant device, so that in a scenario in which multiple BASs corresponding to multiple operators exist in the broadcast domain in which the user terminal is located, and the multiple BASs corresponding to multiple operators all support the PPPoE, a problem that a user terminal cannot perform access because the user terminal establishes a session with an incorrect BAS is resolved, so as to access the user terminal to a BAS by using the PPPoE authentication technology.

The following clearly describes the technical solutions in the embodiments of the present application with reference to the accompanying drawings in the embodiments of the present application. The described embodiments are merely some but not all of the embodiments of the present application. All other embodiments obtained by persons skilled in the art based on the embodiments of the present application without creative efforts shall fall within the protection scope of the present application.

In the specification, claims, and accompanying drawings of the present application, the term "first", "second", "third", "fourth", or the like is intended to distinguish between similar objects but does not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
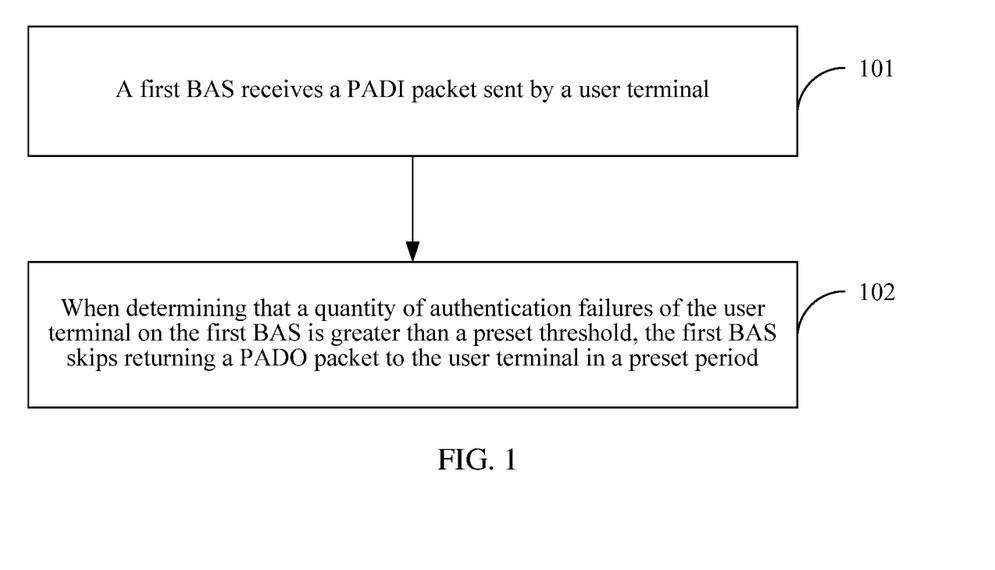
FIG. 1 is a schematic flowchart of a method embodiment according to an embodiment of the present application.

Referring to FIG. 1, an embodiment of the present application provides a method embodiment of a packet processing method in a PPPoE authentication process. In this embodiment, a first BAS exists in a broadcast domain in which a user terminal is located, and the first BAS supports the PPPoE and corresponds to a first operator. A BAS that supports the PPPoE and that corresponds to a second operator also exists in the broadcast domain in which the user terminal is located. This embodiment includes the following steps.

101, the first BAS receives a PADI packet sent by the user terminal.

When the user terminal needs to access a BAS corresponding to a particular operator, the user terminal sends a PADI packet in a broadcast manner. Therefore, the first BAS receives the PADI packet sent by the user terminal.

The PADI packet includes a terminal identifier of the user terminal, such as a Media Access Control (MAC) address of the user terminal.

102, when determining that a quantity of authentication failures of the user terminal on the first BAS is greater than a preset threshold, the first BAS skips sending a PADO packet to the user terminal in a preset period.

In this embodiment of the present application, after receiving the PADI packet, the first BAS does not instantly send the PADO packet to the user terminal, and instead, determines whether the quantity of authentication failures of the user terminal on the first BAS is greater than the preset threshold. If yes, it indicates that the quantity of authentication failures of the user terminal on the first BAS is relatively large, and further indicates that the user terminal probably does not need to access the first BAS, that is, the user terminal does not need to access the first operator. Therefore, the first BAS does not send the PADO packet to the user terminal in the preset period, so that the user terminal does not establish a session with the first BAS, and the user terminal can process in time a PADO packet sent by another BAS except the first BAS, thereby establishing a session with the another BAS. It may be understood that the preset threshold is a numerical value greater than or equal to 0.

An example is used in the following for description. It is assumed that the preset threshold is one, the user terminal can access a telecommunications network according to authentication information 01, and the first BAS corresponds to an education network, and the quantity of authentication failures of the user terminal 01 on the first BAS is two. Therefore, after receiving the PADI packet sent by the user terminal, the first BAS determines that the quantity of authentication failures of the user terminal on the first BAS is greater than one. Therefore, the first BAS does not send the PADO packet to the user terminal in the preset period such as within 10 seconds, so that the user terminal does not establish a session with the first BAS, and instead, the user terminal establishes a session with another BAS, for example, the BAS corresponding to the telecommunications network. Therefore, subsequently, authentication on the BAS corresponding to the telecommunications network according to the authentication information 01 may succeed.

In this embodiment of the present application, the first BAS does not send the PADO packet to the user terminal in the preset period. That is, the first BAS may send the PADO packet to the user terminal after the preset period is delayed, or the first BAS discards the PADI packet, that is, the first BAS does not send the PADO packet after the preset period.

As can be known from the foregoing technical solution, in this embodiment of the present application, when a first BAS receives a PADI packet sent by a user terminal, and determines that a quantity of authentication failures of the user terminal on the first BAS is greater than a preset threshold, it indicates that the quantity of authentication failures of the user terminal on the first BAS is relatively large, and further indicates that the user terminal probably does not need to access the first BAS, that is, the user terminal does not need to access a first operator. Therefore, the first BAS does not send a PADO packet to the user terminal in the preset period, so that the user terminal does not establish a session with the first BAS, thereby resolving a problem that the user terminal cannot perform access because the user terminal establishes a session with the first BAS. Therefore, the user terminal can process in time a PADO packet sent by another BAS except the first BAS, thereby establishing a session with a correct BAS. Therefore, in the present application, the user terminal accesses the BAS by using the PPPoE authentication technology in a scenario in which the first BAS corresponding to the first operator and at least one BAS corresponding to the second operator exist in the broadcast domain in which the user terminal is located, and both the first BAS and the at least one BAS support the PPPoE. In addition, in this embodiment, only the first BAS needs to be improved, and the user terminal does not need to be improved at all.

Optionally, this embodiment further includes when it is determined that the quantity of authentication failures of the user terminal on the first BAS is less than the preset threshold, it indicates that the user terminal probably needs to access the first BAS; therefore, the first BAS sends the PADO packet to the user terminal in the preset period, so that the user terminal can establish a session with the first BAS.

In this embodiment of the present application, when the quantity of authentication failures of the user terminal on the first BAS is equal to the preset threshold, the first BAS may not send the PADO packet to the user terminal in the preset period or may send the PADO packet to the user terminal in the preset period.

In this embodiment of the present application, each time the first BAS receives authentication information, such as a user name or a password, sent by the user terminal, the first BAS may perform authentication according to the authentication information and record according to an authentication result. This embodiment may further include receiving, by the first BAS, authentication information sent by the user terminal; when determining, according to the authentication information, that authentication of the user terminal on the first BAS fails, increasing, by the first BAS, 1 to the quantity of authentication failures of the user terminal on the first BAS. When the quantity of authentication failures is relatively large, it indicates that the user terminal probably does not need to access the first BAS, that is, the user terminal does not need to access the first operator.

However, it should be noted that when the quantity of authentication failures of the user terminal on the first BAS is relatively large, it may indicate that the user terminal does not need to access the first BAS during a particular period. For example, in this period, the user terminal accesses a second BAS by using first authentication information. The user terminal may still access the first BAS by using second authentication information after the period. The second BAS supports the PPPoE and corresponds to the second operator. Therefore, the first BAS may periodically zero out the quantity of authentication failures of the user terminal. This embodiment may further include periodically setting, by the first BAS, the quantity of authentication failures of the user terminal on the first BAS to 0. Therefore, when switching from the second BAS to the first BAS, the user terminal can access the first BAS by using the second authentication information.

This embodiment of the present application is mainly used in a scenario in which the first BAS corresponding to the first operator and at least one BAS corresponding to the second operator exist in the broadcast domain in which the user terminal is located, and both the first BAS and the at least one BAS support the PPPoE. Therefore, in this embodiment, the first BAS may first monitor whether a second BAS that supports the PPPoE and that corresponds to the second operator exists in the broadcast domain in which the user terminal is located. Only when it is detected that the second BAS exists, the first BAS does not send a PADO packet to the user terminal in the preset period. In step 102, the skipping sending, by the first BAS, a PPPoE active discovery offer PADO packet to the user terminal in a preset period includes when determining that a second BAS that supports the PPPoE and that corresponds to the second operator exists in the broadcast domain in which the user terminal is located, skipping sending, by the first BAS, the PADO packet to the user terminal in the preset period.

This embodiment of the present application does not define a manner of monitoring, by the first BAS, whether the second BAS exists. For example, the first BAS may construct a PADI packet and send the PADI packet in a broadcast manner, and after a PADO packet is received, it may be determined that the second BAS is detected.

Figure 2:
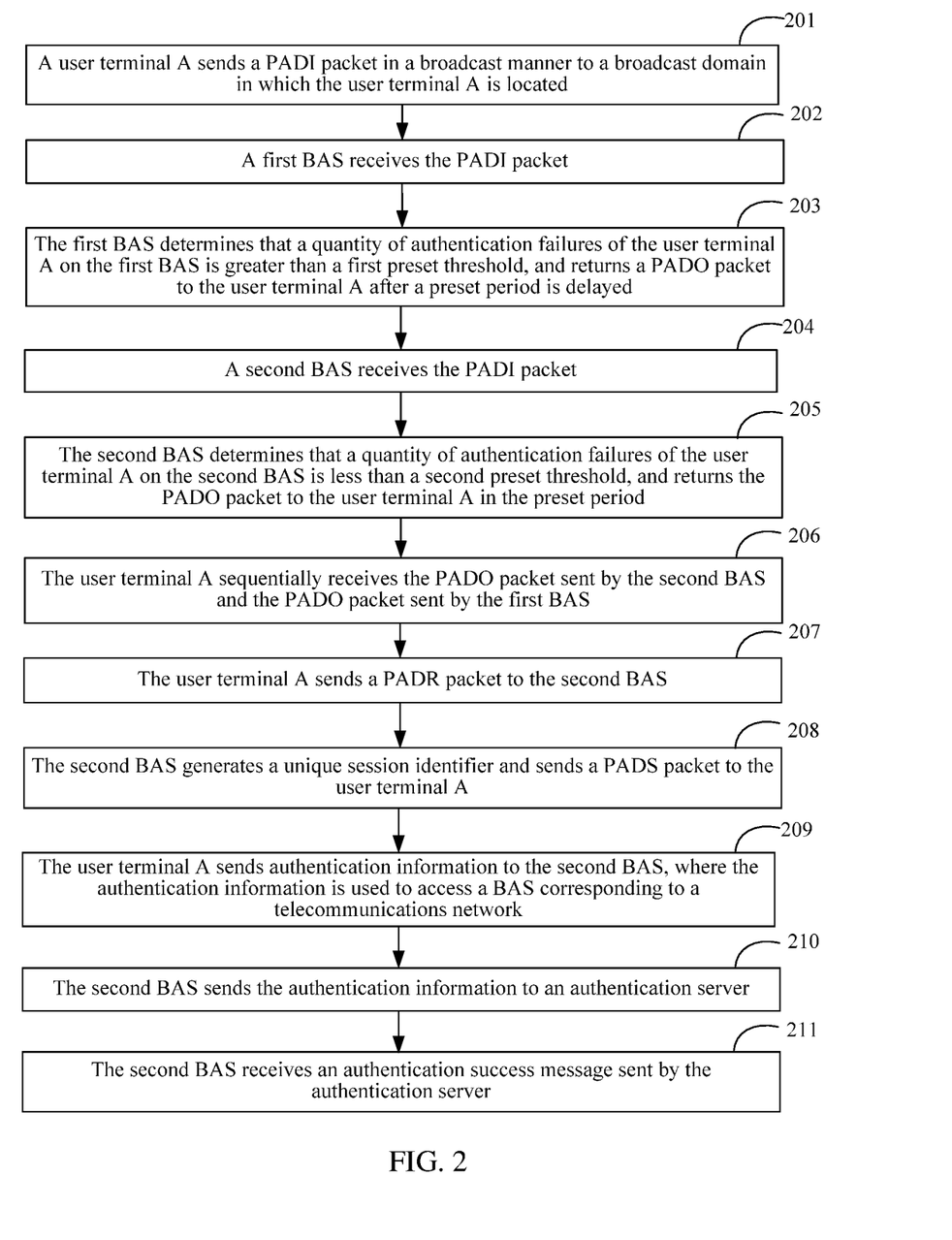
FIG. 2 is a schematic flowchart of another method embodiment according to an embodiment of the present application.

Referring to FIG. 2, an embodiment of the present application provides another method embodiment of a packet processing method in a PPPoE authentication process. In this embodiment, a first BAS and a second BAS exist in a broadcast domain in which a user terminal A is located, where both the first BAS and the second BAS support the PPPoE and respectively correspond to different operators. The first BAS corresponds to an education network, and the second BAS corresponds to a telecommunications network.

This embodiment includes the following steps.

201, the user terminal A sends a PADI packet in a broadcast manner to a broadcast domain in which the user terminal A is located.

At a discovery stage, the user terminal A sends a PADI packet in a broadcast manner to the broadcast domain in which the user terminal A is located. The PADI packet generally includes a terminal identifier of the user terminal A.

202, the first BAS receives the PADI packet.

203, the first BAS determines that a quantity of authentication failures of the user terminal A on the first BAS is greater than a first preset threshold, and sends a PADO packet to the user terminal A after a preset period is delayed.

For example, the first preset threshold is one, and the first BAS determines that the quantity of authentication failures of the user terminal A on the first BAS is 2, which is greater than the first preset threshold. Therefore, it indicates that the user terminal A probably does not need to access the first BAS. Therefore, the first BAS delays sending of the PADO packet, so that the user terminal A preferably processes the PADO packet sent by the second BAS.

It should be noted that in this embodiment, the first BAS may perform step 203 after determining that the second BAS that supports the PPPoE exists in the broadcast domain. If the first BAS determines that the second BAS does not exist in the broadcast domain, that is, only the first BAS is a BAS that supports the PPPoE in the broadcast domain, the first BAS still sends the PADO packet to the user terminal A in the preset period.

204, the second BAS receives the PADI packet.

205, the second BAS determines that the quantity of authentication failures of the user terminal A on the second BAS is less than a second preset threshold, and sends the PADO packet to the user terminal A in the preset period.

For example, the second preset threshold is one, and the second BAS determines that the quantity of authentication failures of the user terminal A on the second BAS is 0, which is less than the second preset threshold. Therefore, it indicates that the user terminal A probably needs to access the second BAS. Therefore, the second BAS instantly sends the PADO packet, so that the user terminal A preferably processes the PADO packet sent by the second BAS.

206, the user terminal A sequentially receives the PADO packet sent by the second BAS and the PADO packet sent by the first BAS.

207, the user terminal A sends a PADR packet to the second BAS.

208, the second BAS generates a unique session identifier and sends a PADS packet to the user terminal A, where the PADS packet carries the session identifier.

According to the foregoing process of step 201 to step 208, the user terminal A establishes a session with the second BAS.

209, the user terminal A sends authentication information to the second BAS, where the authentication information is used to access a BAS corresponding to a telecommunications network.

210, the second BAS sends the authentication information to an authentication server.

211, the second BAS receives an authentication success message sent by the authentication server.

Because the authentication information is used to access the BAS corresponding to the telecommunications network and the second BAS belongs to the telecommunications network, the user terminal A can access the second BAS by using the authentication information.

In the embodiments of the present application that are shown in FIG. 1 and FIG. 2, it is determined, according to a quantity of authentication failures of a user terminal on a first BAS, whether to send a PADO packet to the user terminal in a preset period, thereby resolving a problem that the user terminal cannot perform access because the user terminal establishes a session with the first BAS. In the present application, it may also be determined, by adding authentication information to a PADI packet, whether to send the PADO packet to the user terminal in the preset period.

Figure 3:
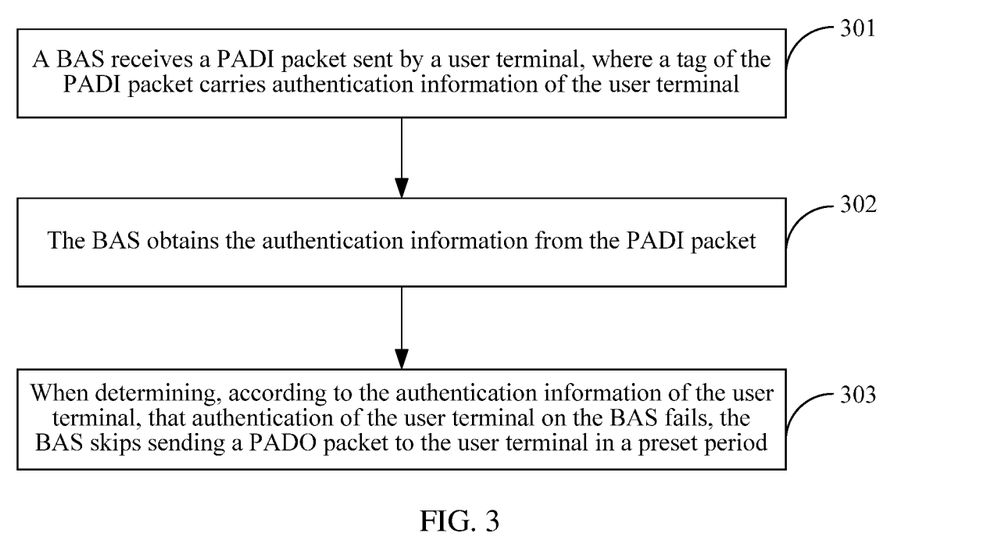
FIG. 3 is a schematic flowchart of another method embodiment according to an embodiment of the present application.

Referring to FIG. 3, an embodiment of the present application provides another method embodiment of a packet processing method in a PPPoE authentication process. This embodiment includes the following steps.

301, a BAS receives a PADI packet sent by a user terminal, where a tag of the PADI packet carries authentication information of the user terminal.

The PADI packet uses a PPPoE frame structure shown in Table 1.

TABLE 1

| VER | TYPE | CODE | SESSION_ID |
|---|---|---|---|
|  | LENGTH |  | payload |

The following describes fields in the frame structure shown in Table 1, the VER field: 4 bits, a PPPoE version number, and a value is 0x1; the Type field: 4 bits, a PPPoE type, and a value is 0x1; the Code field: 8 bits, a PPPoE packet type, and the Code field is 0x09, and indicates a PADI packet; the Session_ID field: 16 bits, and for a given PPP session, this value is a constant value; the Length field: 16 bits, defining a length of a payload field, and not including lengths of an Ethernet header and a PPPoE header; and the payload field includes 0 or more tags. One TAG is a type-length-value (TLV), and a definition of one TAG is shown in Table 2.

TABLE 2

| TYPE_TYPE | TYPE_LENGTH |
|---|---|
|  | TYPE_VALUE . . . |

In this embodiment of the present application, in the PADI packet, at least one tag is carried in the payload field, and authentication information of the user terminal is carried in the at least one tag, so that an authentication process can also be implemented at a discovery stage of the PPPoE. In an implementation manner of the present application, the authentication information may be carried in the tag after encryption. In this case, the tag also carries an encryption manner of the authentication information. For example, the following three tags are carried in the payload field, 0x0301 User-Name, where the tag carries a user name entered by a user on the user terminal; 0x0302 User-Password, where the tag carries a password entered by the user on the user terminal; and 0x0303 User-Password-Type, where the tag carries an encryption manner used by the password.

The 0x0301, 0x0302, and 0x0303 are respectively used to identify that the tags are used to carry authentication information and an encryption manner. In some embodiments, another undefined identifier may also be used.

302, the BAS obtains the authentication information from the PADI packet.

After receiving the PADI packet, the BAS parses to obtain whether there is a tag carrying the authentication information, and if yes, obtains the authentication information from the tag for authentication. Optionally, in this embodiment, when the PADI packet does not include the authentication information, the BAS sends a PADO packet to the user terminal in the preset period.

303, when determining, according to the authentication information of the user terminal, that authentication of the user terminal on the BAS fails, the BAS skips sending a PADO packet to the user terminal in a preset period.

After obtaining the authentication information, the BAS may perform authentication according to the authentication information. For example, the BAS may send the authentication information to an authentication server for authentication and receive an authentication result of the authentication server. The determining, according to the authentication information of the user terminal, that authentication of the user terminal on the BAS fails may include sending, by the BAS, the authentication information to an authentication server; and receiving, by the BAS, an authentication failure message sent by the authentication server.

In this embodiment, after receiving the PADI packet, the BAS does not instantly send the PADO packet to the user terminal, and instead, determines whether authentication of the authentication information carried in the PADI packet can succeed. If not, it indicates that the user terminal does not need to access the BAS. Therefore, the BAS does not send the PADO packet to the user terminal in the preset period, so that the user terminal does not establish a session with the BAS. In addition, the user terminal can process in time a PADO packet sent by another BAS except the foregoing BAS, thereby establishing a session with the another BAS.

In this embodiment of the present application, the BAS does not send the PADO packet to the user terminal in the preset period. That is, the BAS may send the PADO packet to the user terminal after the preset period is delayed, or the BAS discards the PADI packet, that is, the BAS does not send the PADO packet after the preset period.

As can be known from the foregoing technical solution, in this embodiment of the present application, a PADI packet that is sent by a user terminal and that is received by a BAS carries one or more tags, and the tag carries authentication information of the user terminal, so as to advance an authentication process. Therefore, after receiving the PADI packet sent by the user terminal, the BAS does not instantly send a PADO packet to the user terminal, and instead, obtains the authentication information from the PADI packet. When determining, according to the authentication information, that authentication of the user terminal on the BAS fails, it indicates that the user terminal does not need to access the BAS. Therefore, the BAS does not send the PADO packet to the user terminal in the preset period, so that the user terminal preferably processes a PADO packet sent by another BAS except the foregoing BAS, and does not establish a session with the foregoing BAS, thereby resolving a problem that the user terminal cannot perform access because the user terminal establishes a session with the foregoing BAS. In this embodiment, the user terminal can access a BAS by using a PPPoE authentication technology in a scenario in which the BAS corresponding to the first operator and at least one BAS corresponding to the second operator exist in a broadcast domain in which the user terminal is located, and both the BAS and the at least one BAS support the PPPoE.

Optionally, this embodiment further includes when determining, according to the authentication information of the user terminal, that authentication of the user terminal on the BAS succeeds, it further indicates that the user terminal needs to access the BAS; therefore, the BAS sends the PADO packet to the user terminal in the preset period, so that the user terminal can establish a session with the BAS.

In the embodiment shown in FIG. 3, a packet processing method of this embodiment of the present application is described from a perspective of a BAS. Correspondingly, the following describes this embodiment of the present application from a perspective of a user terminal.

Figure 4:
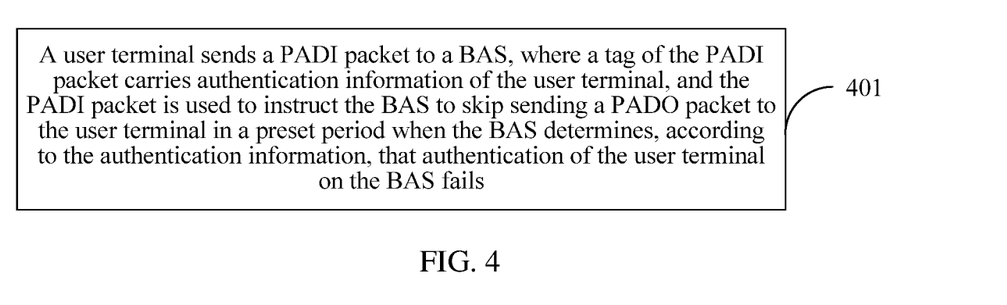
FIG. 4 is a schematic flowchart of another method embodiment according to an embodiment of the present application.

Referring to FIG. 4, an embodiment of the present application provides another method embodiment of a packet processing method in a PPPoE authentication process. This embodiment includes the following steps.

401, a user terminal sends a PADI packet to a BAS, where a tag of the PADI packet carries authentication information of the user terminal, and the PADI packet is used to instruct the BAS to skip sending a PADO packet to the user terminal in a preset period when the BAS determines, according to the authentication information, that authentication of the user terminal on the BAS fails.

As can be seen, in this embodiment of the present application, the PADI packet sent by the user terminal to the BAS carries authentication information of the user terminal, so that the BAS can perform authentication according to the authentication information. When determining that authentication of the user terminal on the BAS fails, the BAS does not send the PADO packet to the user terminal in the preset period. For example, the BAS discards the PADI packet. When determining that authentication of the user terminal on the BAS succeeds, the BAS sends the PADO packet to the user terminal in the preset period, so as to establish a session with the user terminal.

In this embodiment and the embodiment shown in FIG. 3, the embodiments of the present application are described respectively from perspectives of different devices. Therefore, the technical content of this embodiment corresponds to the embodiment shown in FIG. 3. For relevant content, refer to the embodiment shown in FIG. 3, and details are not described in this embodiment again.

The foregoing describes the method embodiments of the packet processing method in the embodiments of the present application, and the following describes a BAS and a user terminal in the embodiments of the present application from a perspective of a modular functional entity.

Figure 5:
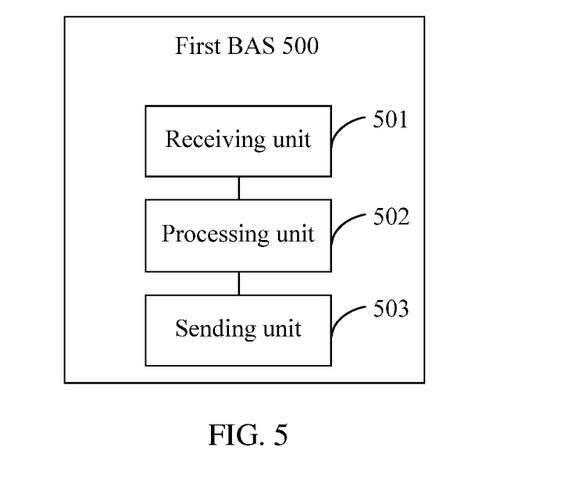
FIG. 5 is a schematic structural diagram of an apparatus embodiment according to an embodiment of the present application.

Referring to FIG. 5, an embodiment of the present application provides an apparatus embodiment of a BAS. The BAS is a first BAS 500 that supports the PPPoE and that corresponds to a first operator, and the first BAS 500 is in a broadcast domain in which a user terminal is located. A BAS that supports the PPPoE and that corresponds to a second operator also exists in the broadcast domain in which the user terminal is located.

The first BAS 500 includes a receiving unit 501, a processing unit 502, and a sending unit 503.

The receiving unit 501 is configured to receive a PADI packet sent by the user terminal.

When the user terminal needs to access a BAS corresponding to a particular operator, the user terminal sends a PADI packet in a broadcast manner. Therefore, the receiving unit 501 of the first BAS 500 receives the PADI packet sent by the user terminal.

The PADI packet includes a terminal identifier of the user terminal such as a MAC address of the user terminal.

The processing unit 502 is configured to when determining that a quantity of authentication failures of the user terminal on the first BAS 500 is greater than a preset threshold, skip sending a PADO packet to the user terminal in a preset period by using the sending unit 503.

In this embodiment of the present application, after the receiving unit 501 receives the PADI packet, the sending unit 503 does not instantly send the PADO packet to the user terminal. Instead, the processing unit 502 determines whether the quantity of authentication failures of the user terminal on the first BAS 500 is greater than the preset threshold. If yes, it indicates that the quantity of authentication failures of the user terminal on the first BAS 500 is relatively large, and further indicates that the user terminal probably does not need to access the first BAS 500, that is, the user terminal does not need to access the first operator. Therefore, the first BAS does not send the PADO packet to the user terminal in the preset period by using the sending unit 503, so that the user terminal does not establish a session with the first BAS 500, and the user terminal can process in time a PADO packet sent by another BAS except the first BAS 500, thereby establishing a session with the another BAS. It may be understood that the preset threshold is a numerical value greater than or equal to 0.

An example is used in the following for description. It is assumed that the preset threshold is one, the user terminal can access a telecommunications network according to authentication information 01, and the first BAS 500 corresponds to an education network, and the quantity of authentication failures of the user terminal 01 on the first BAS 500 is two. Therefore, after the receiving unit 501 receives the PADI packet sent by the user terminal, the processing unit 502 determines that the quantity of authentication failures of the user terminal on the first BAS 500 is greater than one. Therefore, the first BAS does not send the PADO packet to the user terminal in the preset period such as within 10 seconds by using the sending unit 503, so that the user terminal does not establish a session with the first BAS 500, and instead, the user terminal establishes a session with another BAS, for example, a BAS corresponding to the telecommunications network. Therefore, subsequently, authentication on the BAS corresponding to the telecommunications network according to the authentication information 01 may succeed.

In this embodiment of the present application, the PADO packet is not sent to the user terminal in the preset period by using the sending unit 503. That is, the processing unit 502 may send, by using the sending unit 503, the PADO packet to the user terminal after the preset period is delayed, or the processing unit 502 discards the PADI packet, that is, the processing unit does not send the PADO packet after the preset period.

As can be known from the foregoing technical solution, in this embodiment of the present application, when the receiving unit 501 receives a PADI packet sent by a user terminal, and when it is determined that a quantity of authentication failures of the user terminal on the first BAS 500 is greater than a preset threshold, it indicates that the quantity of authentication failures of the user terminal on the first BAS 500 is relatively large, and further indicates that the user terminal probably does not need to access the first BAS 500, that is, the user terminal does not need to access a first operator. Therefore, the processing unit 502 does not send a PADO packet to the user terminal in the preset period by using the sending unit 503, so that the user terminal does not establish a session with the first BAS 500, thereby resolving a problem that the user terminal cannot perform access because the user terminal and the first BAS 500 establish a session. Therefore, the user terminal can process in time a PADO packet sent by another BAS except the first BAS 500, thereby establishing a session with a correct BAS. Therefore, in the present application, the user terminal accesses the BAS by using the PPPoE authentication technology in a scenario in which the first BAS 500 corresponding to the first operator and at least one BAS corresponding to the second operator exist in the broadcast domain in which the user terminal is located, and both the first BAS 500 and the at least one BAS support the PPPoE. In addition, in this embodiment, only the first BAS 500 needs to be improved, and the user terminal does not need to be improved at all.

Optionally, the processing unit 502 in this embodiment is further configured to when determining that the quantity of authentication failures of the user terminal on the first BAS 500 is less than the preset threshold, further indicate that the user terminal probably needs to access the first BAS 500. Therefore, the processing unit 502 sends the PADO packet to the user terminal in the preset period by using the sending unit 503, so that the user terminal can establish a session with the first BAS 500.

In this embodiment of the present application, the processing unit 502 may be further configured to when determining that the quantity of authentication failures of the user terminal on the first BAS 500 is equal to the preset threshold, skip sending the PADO packet to the user terminal in the preset period by using the sending unit 503, or send the PADO packet to the user terminal in the preset period by using the sending unit 503.

In this embodiment of the present application, each time the receiving unit 501 receives authentication information, such as a user name or a password, sent by the user terminal, the processing unit 502 may perform authentication according to the authentication information and record according to an authentication result. The receiving unit 501 in this embodiment is further configured to receive the authentication information sent by the user terminal, and the processing unit 502 is further configured to when determining, according to the authentication information, that authentication of the user terminal on the first BAS 500 fails, increase 1 to the quantity of authentication failures of the user terminal on the first BAS 500. When the quantity of authentication failures is relatively large, it indicates that the user terminal probably does not need to access the first BAS 500, that is, the user terminal does not need to access the first operator.

However, it should be noted that when the quantity of authentication failures of the user terminal on the first BAS 500 is relatively large, it may indicate that the user terminal does not need to access the first BAS 500 during a particular period. For example, in this period, the user terminal accesses a second BAS by using first authentication information. The user terminal may still access the first BAS 500 by using second authentication information after the period, and the second BAS supports the PPPoE and corresponds to the second operator. Therefore, the first BAS 500 may periodically zero out the quantity of authentication failures of the user terminal. The processing unit 502 may be further configured to periodically set the quantity of authentication failures of the user terminal on the first BAS 500 to 0. Therefore, when switching from the second BAS to the first BAS 500, the user terminal can access the first BAS 500 by using the second authentication information.

This embodiment of the present application is mainly used in a scenario in which the first BAS 500 corresponding to the first operator and at least one BAS corresponding to the second operator exist in the broadcast domain in which the user terminal is located, and both the first BAS 500 and the at least one BAS support the PPPoE. Therefore, in this embodiment, the processing unit 502 may first monitor whether a second BAS that supports the PPPoE and that corresponds to the second operator exists in the broadcast domain in which the user terminal is located. Only when it is detected that the second BAS exists, the first BAS does not send a PADO packet to the user terminal in the preset period by using the sending unit 503. When the PADO packet is not sent to the user terminal in the preset period by using the sending unit 503, the processing unit 502 is configured to when determining that the second BAS that supports the PPPoE and that corresponds to the second operator exists in the broadcast domain in which the user terminal is located, skip sending the PADO packet to the user terminal in the preset period by using the sending unit 503.

This embodiment of the present application does not define a manner of monitoring, by the processing unit 502, whether the second BAS exists. For example, the processing unit 502 may construct a PADI packet and send the PADI packet in a broadcast manner, and after a PADO packet is received by using the receiving unit 501, it may be determined that the second BAS is detected.

In the foregoing embodiment shown in FIG. 5, in the present application, it is determined, according to a quantity of authentication failures of a user terminal on the first BAS 500, whether to send a PADO packet to the user terminal in a preset period, thereby resolving a problem that the user terminal cannot perform access because the user terminal establishes a session with the first BAS 500. In the present application, it may also be determined, by adding authentication information to a PADI packet, whether to send the PADO packet to the user terminal in the preset period.

Figure 6:
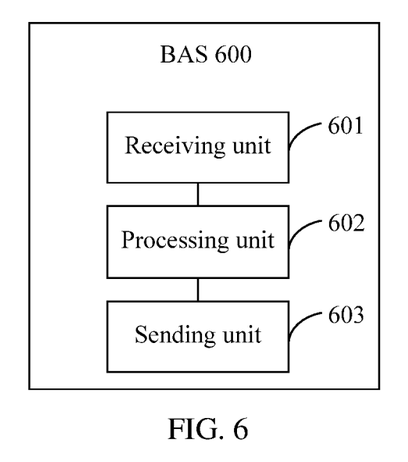
FIG. 6 is a schematic structural diagram of another apparatus embodiment according to an embodiment of the present application.

Referring to FIG. 6, an embodiment of the present application provides another apparatus embodiment of a BAS. A BAS 600 of this embodiment includes a receiving unit 601, a processing unit 602, and a sending unit 603.

The receiving unit 601 is configured to receive a PADI packet sent by a user terminal, where a tag of the PADI packet carries authentication information of the user terminal.

The PADI packet uses a PPPoE frame structure shown in Table 1.

In this embodiment of the present application, in the PADI packet, at least one tag is carried in the payload field, and authentication information of the user terminal is carried in the at least one tag, so that an authentication process can also be implemented at a discovery stage of the PPPoE. In an implementation manner of the present application, the authentication information may be carried in the tag after encryption. In this case, the tag also carries an encryption manner of the authentication information. For example, the following three tags are carried in the payload field, 0x0301 User-Name, where the tag carries a user name entered by a user on the user terminal; 0x0302 User-Password, where the tag carries a password entered by the user on the user terminal; and 0x0303 User-Password-Type, where the tag carries an encryption manner used by the password.

The 0x0301, 0x0302, and 0x0303 are respectively used to identify that the tags are used to carry authentication information and an encryption manner. In some embodiments, another undefined identifier may also be used.

The processing unit 602 is configured to obtain the authentication information from the PADI packet.

After receiving the PADI packet, the BAS 600 parses to obtain whether there is a tag carrying the authentication information, and if yes, obtains the authentication information from the tag for authentication. Optionally, the processing unit 602 in this embodiment may be further configured to when the PADI packet does not include the authentication information, send the PADO packet to the user terminal in the preset period by using the sending unit 603.

The processing unit 602 is further configured to when determining, according to the authentication information of the user terminal, that authentication of the user terminal on the BAS 600 fails, skip sending a PADO packet to the user terminal in the preset period by using the sending unit 603.

After obtaining the authentication information, the processing unit 602 performs authentication according to the authentication information. For example, the processing unit 602 may send the authentication information to an authentication server for authentication and receive an authentication result of the authentication server. When determining, according to the authentication information of the user terminal, that authentication of the user terminal on the BAS 600 fails, the processing unit 602 may be configured to send the authentication information to the authentication server by using the sending unit 603, and receive, by using the receiving unit 601, an authentication failure message sent by the authentication server.

In this embodiment, after the receiving unit 601 receives the PADI packet, the sending unit 603 does not instantly send the PADO packet to the user terminal. Instead, the processing unit 602 determines whether authentication of the authentication information carried in the PADI packet can succeed. If not, it indicates that the user terminal does not need to access the BAS 600. Therefore, the PADO packet is not sent to the user terminal in the preset period by using the sending unit 603, so that the user terminal does not establish a session with the BAS 600. In addition, the user terminal can process in time a PADO packet sent by another BAS 600 in addition to the foregoing BAS 600, thereby establishing a session with the another BAS 600.

In this embodiment of the present application, the processing unit 602 does not send the PADO packet to the user terminal in the preset period by using the sending unit 603. That is, the processing unit 602 may send, by using the sending unit 603, the PADO packet to the user terminal after the preset period is delayed, or the processing unit 602 discards the PADI packet, that is, skips sending the PADO packet after the preset period by using the sending unit 603.

As can be known from the foregoing technical solution, in this embodiment of the present application, a PADI packet that is sent by a user terminal and that is received by the receiving unit 601 carries one or more tags, and the tag carries authentication information of the user terminal, so as to advance an authentication process. Therefore, after the receiving unit 601 receives the PADI packet sent by the user terminal, the sending unit 603 does not instantly send a PADO packet to the user terminal. Instead, a processing unit 602 obtains the authentication information from the PADI packet. When determining, according to the authentication information, that authentication of the user terminal on the BAS 600 fails, it indicates that the user terminal does not need to access the BAS 600. Therefore, the PADO packet is not sent to the user terminal in a preset period by using the sending unit 603, so that the user terminal preferably processes a PADO packet sent by another BAS 600 in addition to the foregoing BAS 600, and does not establish a session with the foregoing BAS 600, thereby resolving a problem that the user terminal cannot perform access because the user terminal establishes a session with the foregoing BAS 600. In this embodiment, the user terminal can access a BAS by using a PPPoE authentication technology in a scenario in which the BAS 600 corresponding to a first operator and at least one BAS corresponding to a second operator exist in a broadcast domain in which the user terminal is located, and both the BAS 600 and the at least one BAS support the PPPoE.

Optionally, the processing unit 602 is further configured to when determining, according to the authentication information of the user terminal, that authentication of the user terminal on the BAS 600 succeeds, further indicate that the user terminal needs to access the BAS 600. Therefore, the PADO packet is sent to the user terminal in the preset period by using the sending unit 603, so that the user terminal can establish a session with the BAS 600.

In the embodiment shown in FIG. 6, an apparatus of an embodiment of the present application is described from a perspective of a BAS. Correspondingly, the following describes an embodiment of the present application from a perspective of a user terminal.

Figure 7:
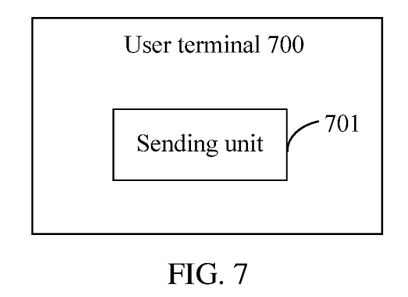
FIG. 7 is a schematic structural diagram of another apparatus embodiment according to an embodiment of the present application.

Referring to FIG. 7, an embodiment of the present application provides an embodiment of a user terminal. The user terminal 700 of this embodiment includes a sending unit 701.

The sending unit 701 is configured to send a PADI packet to a BAS, where a tag of the PADI packet carries authentication information of the user terminal 700, and the PADI packet is used to instruct the BAS to skip sending a PADO packet to the user terminal 700 in a preset period when the BAS determines, according to the authentication information, that authentication of the user terminal 700 on the BAS fails.

As can be seen, in this embodiment of the present application, the PADI packet sent by the user terminal 700 to the BAS carries authentication information of the user terminal, so that the BAS can perform authentication according to the authentication information. When determining that authentication of the user terminal 700 on the BAS fails, the BAS does not send the PADO packet to the user terminal 700 in the preset period. For example, the BAS discards the PADI packet. When determining that authentication of the user terminal 700 on the BAS succeeds, the BAS sends the PADO packet to the user terminal 700 in the preset period, so as to establish a session with the user terminal 700.

In this embodiment and the embodiment shown in FIG. 6, the embodiments of the present application are described respectively from perspectives of different devices. Therefore, the technical content of this embodiment corresponds to the embodiment shown in FIG. 6. For relevant content, refer to the embodiment shown in FIG. 6, and details are not described in this embodiment again.

The foregoing describes a BAS and a user terminal in the embodiments of the present application from a perspective of a modular functional entity. The following describes a BAS and a user terminal in this embodiment of the present application from a perspective of hardware processing.

Figure 8:
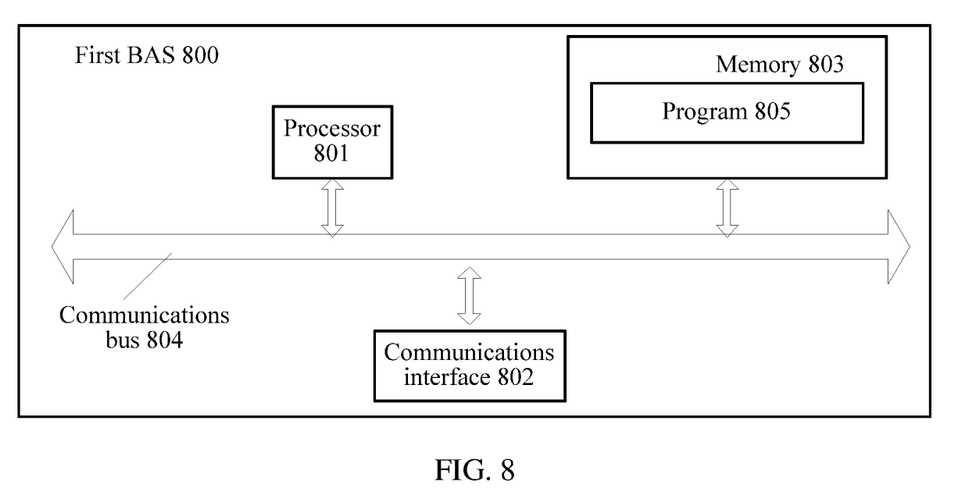
FIG. 8 is a schematic structural diagram of another apparatus embodiment according to an embodiment of the present application.

Referring to FIG. 8, an embodiment of the present application provides another apparatus embodiment of a BAS. The BAS is a first BAS 800 that supports the PPPoE and that corresponds to a first operator, and the first BAS 800 is in a broadcast domain in which a user terminal is located. A BAS that supports the PPPoE and that corresponds to a second operator also exists in the broadcast domain in which the user terminal is located.

The first BAS 800 of this embodiment includes a processor 801, a communications interface 802, a memory 803, and a communications bus 804.

The processor 801, the communications interface 802, and the memory 803 communicate with each other by using the bus 804.

The processor 801 is configured to execute a program 805.

The program 805 may include program code, and the program code includes a computer operation instruction.

The processor 801 may be a central processing unit (CPU), or an application-specific integrated circuit (ASIC), or one or more integrated circuits configured to implement the embodiments of this application.

The memory 803 is configured to store the program 805. The memory 803 may include a high-speed random access memory (RAM), and may further include a non-volatile memory, such as at least one magnetic disk memory. The program 805 is configured to perform the following steps, receiving a PPPoE active discovery initiation PADI packet sent by the user terminal; and when determining that a quantity of authentication failures of the user terminal on the first BAS is greater than a preset threshold, skipping sending a PPPoE active discovery offer PADO packet to the user terminal in a preset period.

For implementation of steps in the program 805, refer to implementation manners of corresponding units in the embodiment shown in FIG. 5, and details are not described herein.

Figure 9:
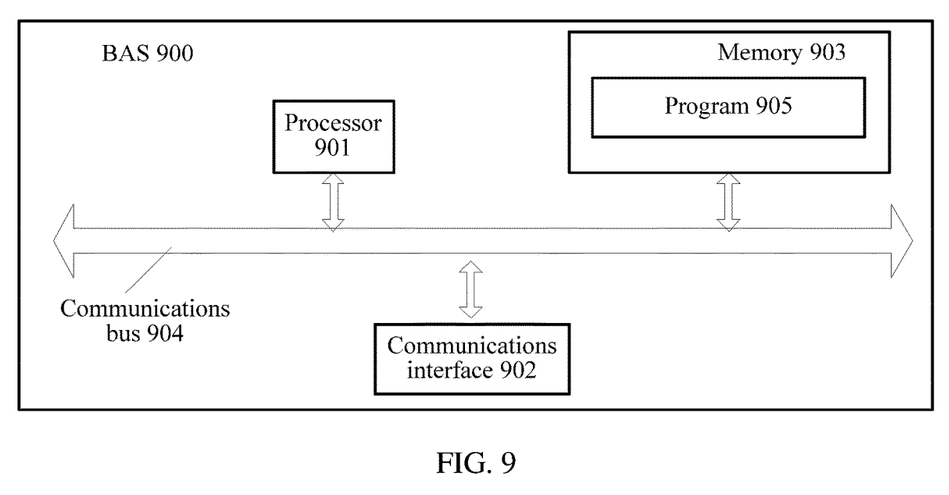
FIG. 9 is a schematic structural diagram of another apparatus embodiment according to an embodiment of the present application.

Referring to FIG. 9, an embodiment of the present application provides another apparatus embodiment of a BAS. A BAS 900 of this embodiment includes a processor 901, a communications interface 902, a memory 903, and a communications bus 904.

The processor 901, the communications interface 902, and the memory 903 communicate with each other by using the bus 904.

The processor 901 is configured to execute a program 905.

The program 905 may include program code, and the program code includes a computer operation instruction.

The processor 901 may be a CPU, or an ASIC, or one or more integrated circuits configured to implement the embodiments of this application.

The memory 903 is configured to store the program 905. The memory 903 may include a high-speed RAM, and may further include a non-volatile memory, such as at least one magnetic disk memory. The program 905 is configured to perform the following steps, receiving a PPPoE active discovery initiation PADI packet sent by a user terminal, where a tag of the PADI packet carries authentication information of the user terminal; obtaining the authentication information from the PADI packet; and when determining, according to the authentication information of the user terminal, that authentication of the user terminal on the BAS fails, skipping sending a PPPoE active discovery offer PADO packet to the user terminal in a preset period.

For implementation of steps in the program 905, refer to implementation manners of corresponding units in the embodiment shown in FIG. 6, and details are not described herein.

Figure 10:
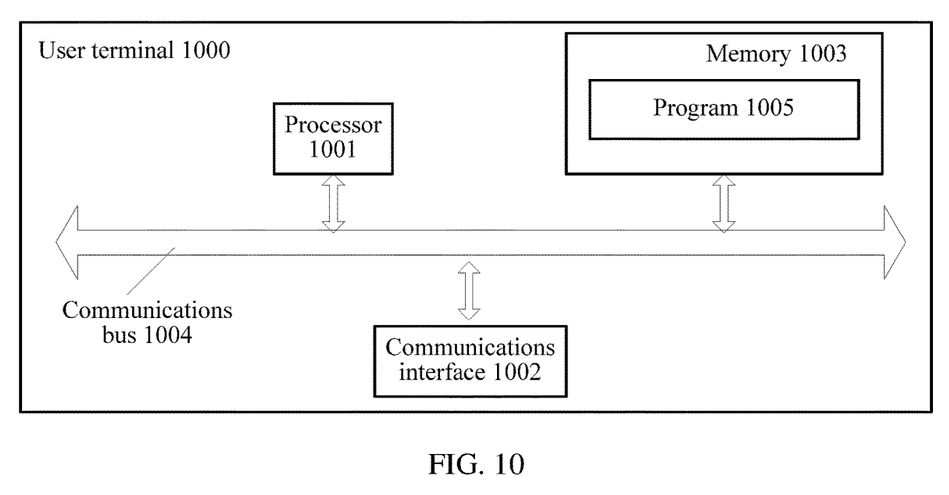
FIG. 10 is a schematic structural diagram of another apparatus embodiment according to an embodiment of the present application.

Referring to FIG. 10, an embodiment of the present application provides another apparatus embodiment of a user terminal. A user terminal 1000 of this embodiment includes a processor 1001, a communications interface 1002, a memory 1003, and a communications bus 1004.

The processor 1001, the communications interface 1002, and the memory 1003 communicate with each other by using the bus 1004.

The processor 1001 is configured to execute a program 1005.

The program 1005 may include program code, and the program code includes a computer operation instruction.

The processor 1001 may be a CPU, or an ASIC, or one or more integrated circuits configured to implement the embodiments of this application.

The memory 1003 is configured to store the program 1005. The memory 1003 may include a high-speed RAM, and may further include a non-volatile memory, such as at least one magnetic disk memory. The program 1005 is configured to perform the following step, sending a PADI packet to a BAS, where a tag of the PADI packet carries authentication information of the user terminal, and the PADI packet is used to instruct the BAS to skip sending a PPPoE active discovery offer PADO packet to the user terminal in a preset period when the BAS determines, according to the authentication information, that authentication of the user terminal on the BAS fails.

For implementation of steps in the program 1005, refer to implementation manners of corresponding units in the embodiment shown in FIG. 7, and details are not described herein.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application may be implemented in the form of a software product. The computer software product is stored in a storage medium and includes several instructions for instructing a computer device (which may be a personal computer, a server, or a network device) to perform all or some of the steps of the methods described in the embodiments of the present application. The foregoing storage medium includes any medium that can store program code, such as a USB flash drive, a removable hard disk, a read-only memory (ROM), a RAM, a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present application.

What is claimed is:

1. A packet processing method in a Point-to-Point Protocol over Ethernet (PPPoE) authentication process in a broadcast domain, the method comprising:
   receiving, by a first broadband access server (BAS) corresponding to a first operator, a first PPPoE active discovery initiation (PADI) packet from a user terminal in the broadcast domain;
   determining that a quantity of authentication failures of the user terminal on the first BAS is greater than a preset threshold; and
   skipping sending, by the first BAS, a PPPoE active discovery offer (PADO) packet to the user terminal for a preset period in response to determining that the quantity of authentication failures of the user terminal on the first BAS is greater than the preset threshold.

2. The method of claim 1 further comprising sending, by the first BAS, the PADO packet to the user terminal after the preset period in response to receiving a second PADI packet when the quantity of authentication failures of the user terminal on the first BAS is less than the preset threshold.

3. The method of claim 1 further comprising determining that a second BAS that supports the PPPoE and that corresponds to a second operator exists in the broadcast domain in which the user terminal is located, wherein sending of the PADO packet is skipped when the second BAS that corresponds to the second operator exists in the broadcast domain.

4. The method of claim 1 further comprising:
   receiving, by the first BAS, authentication information from the user terminal;
   determining, based on the authentication information, that authentication of the user terminal on the first BAS fails; and
   increasing, by the first BAS, the quantity of authentication failures of the user terminal on the first BAS.

5. The method of claim 1 further comprising periodically setting, by the first BAS, the quantity of authentication failures of the user terminal on the first BAS to 0.

6. The method of claim 1, wherein the authentication failures of the user terminal are caused when the first BAS receives authentication information intended for a second BAS.

7. The method of claim 1, wherein the preset period provides time for the user terminal to establish a session with a second BAS.

8. The method of claim 1, wherein the first PADI packet is received as part of a broadcast from the user terminal over the broadcast domain.

9. A packet processing method in a Point-to-Point Protocol over Ethernet (PPPoE) authentication process, the method comprising:
   receiving, by a first broadband access server (BAS), a first PPPoE active discovery initiation (PADI) packet from a user terminal, wherein a tag of the first PADI packet comprises authentication information of the user terminal;
   obtaining, by the first BAS, the authentication information from the first PADI packet;
   determining, that a second BAS that supports the PPPoE and that corresponds to a second operator, exists in the broadcast domain in which the user terminal is located; and then
   skipping sending, by the first BAS, a PPPoE active discovery offer (PADO) packet to the user terminal for a preset period, wherein sending of the PADO packet is skipped when determining, based on the authentication information of the user terminal, that authentication of the user terminal on the first BAS fails.

10. The method of claim 9 further comprising sending, by the first BAS, the PADO packet to the user terminal after the preset period in response to receiving a second PADI packet when determining, based on authentication information of the user terminal in the second PADI packet, that authentication of the user terminal on the first BAS succeeds.

11. The method of claim 9, wherein determining that authentication of the user terminal on the first BAS fails comprises:
   sending, by the first BAS, the authentication information to an authentication server; and
   receiving, by the first BAS, an authentication failure message from the authentication server.

12. The method of claim 9, wherein the preset period provides time for the user terminal to establish a session with the second BAS.

13. The method of claim 9, wherein the first PADI packet is received as part of a broadcast from the user terminal over the broadcast domain.

14. A first broadband access server (BAS) comprising:
a communications interface; and
a processor coupled to the communications interface, the processor configured to:
   receive, via the communications interface, a first Point-to-Point Protocol over Ethernet (PPPoE) active discovery initiation (PADI) packet from a user terminal in a broadcast domain;
   determine a quantity of authentication failures of the user terminal on the first BAS; and
   skip sending a PPPoE active discovery offer (PADO) packet to the user terminal for a preset period by using the communications interface, wherein sending of the PADO packet is skipped when the quantity of authentication failures of the user terminal on the first BAS is greater than a preset threshold, wherein the first BAS supports PPPoE and corresponds to a first operator, and wherein the first BAS is in the broadcast domain.

15. The first BAS of claim 14, wherein the processor is further configured to send the PADO packet to the user terminal via the communications interface after the preset period in response to receiving a second PADI packet when the quantity of authentication failures of the user terminal on the first BAS is less than the preset threshold.

16. The first BAS of claim 14, wherein the processor is further configured to determine that a second BAS that supports the PPPoE and that corresponds to a second operator exists in the broadcast domain in which the user terminal is located, wherein sending of the PADO packet is skipped when the second BAS that corresponds to the second operator exists in the broadcast domain.

17. The first BAS of claim 14, wherein the processor is further configured to:

receive authentication information from the user terminal via the communications interface;

determine, based on the authentication information, that authentication of the user terminal on the first BAS fails; and increase the quantity of authentication failures of the user terminal on the first BAS.

18. The first BAS of claim 14, wherein the processor is further configured to periodically set the quantity of authentication failures of the user terminal on the first BAS to 0.

19. The first BAS of claim 14, wherein the preset period provides time for the user terminal to establish a session with a second BAS.

20. The first BAS of claim 14, wherein the first PADI packet is received as part of a broadcast from the user terminal over the broadcast domain.

* * * * *

UNITED STATES PATENT AND TRADEMARK OFFICE
CERTIFICATE OF CORRECTION

| | |
|---|---|
| PATENT NO. | : 10,666,650 B2 |
| APPLICATION NO. | : 15/795835 |
| DATED | : May 26, 2020 |
| INVENTOR(S) | : Ting Hu and Guofeng Qian |

It is certified that error appears in the above-identified patent and that said Letters Patent is hereby corrected as shown below:

On the Title Page

Related U.S. Application Data: "PCT/CN2015/097532." should read "PCT/CN2015/097532 filed on December 16, 2015".

Signed and Sealed this
Fourteenth Day of July, 2020

Andrei Iancu
*Director of the United States Patent and Trademark Office*